(12) United States Patent
De Goes et al.

(10) Patent No.: US 10,740,968 B2
(45) Date of Patent: Aug. 11, 2020

(54) PATCH-BASED SURFACE RELAXATION

(71) Applicant: Pixar, Emeryville, CA (US)

(72) Inventors: Fernando Ferrari De Goes, Berkeley, CA (US); William F. Sheffler, Lafayette, CA (US); Michael B. Comet, Concord, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 16/275,136

(22) Filed: Feb. 13, 2019

(65) Prior Publication Data

US 2019/0251745 A1  Aug. 15, 2019

Related U.S. Application Data

(60) Provisional application No. 62/630,763, filed on Feb. 14, 2018.

(51) Int. Cl.
*G06T 17/20* (2006.01)

(52) U.S. Cl.
CPC ................... *G06T 17/205* (2013.01)

(58) Field of Classification Search
None
See application file for complete search history.

(56) References Cited

U.S. PATENT DOCUMENTS

| | | | | |
|---|---|---|---|---|
| 2014/0267252 | A1* | 9/2014 | Hutchinson | G06T 19/20 345/420 |
| 2015/0123967 | A1* | 5/2015 | Quinn | G06T 13/40 345/420 |
| 2017/0301110 | A1* | 10/2017 | Auclair | H04N 21/00 |

OTHER PUBLICATIONS

De Goes F, Sheffler W, Comet M, Martinez A, Kutt A. Patch-based surface relaxation. InACM SIGGRAPH 2018 Talks Aug. 12, 2018 (pp. 1-2). (Year: 2018).*
M. Desbrun, M. Meyer, P. Schröder, and A. H. Barr. 1999. Implicit Fairing of Irregular Meshes Using Diffusion and Curvature Flow. In SIGGRAPH. 317-324.
Y. Lipman, O. Sorkine, D. Cohen-Or, D. Levin, C. Rössl, and H.-P. Seidel. 2004. Differential Coordinates for Interactive Mesh Editing. In Proc. of SMI. 181-190.

(Continued)

*Primary Examiner* — Vu Nguyen
(74) *Attorney, Agent, or Firm* — Patterson + Sheridan, LLP (57) ABSTRACT

Surface relaxation techniques are disclosed for smoothing the shapes of three-dimensional (3D) virtual geometry. In one embodiment, a surface relaxation application determines, for each of a number of vertices of a 3D virtual geometry, span-aware weights for each edge incident to the vertex based on the alignment of other edges incident to the vertex with an orthonormal frame of the edge constructed using a decal map. The surface relaxation application uses such span-aware weights to compute weighted averages that provide surface relaxation offsets. Further, the surface relaxation application may restore relaxation offsets from an original to a deformed geometry by determining relaxation offsets for both geometries and transferring the relaxation offsets from the original to the deformed 3D geometry using a blending of the determined relaxation offsets and a rotation. In another embodiment, volume is preserved by computing relaxation offsets in the plane and lifting relaxed vertices back to 3D.

20 Claims, 9 Drawing Sheets

(56) References Cited

OTHER PUBLICATIONS

J. Mancewicz, M. L. Derksen, H. Rijpkema, and C. A. Wilson. 2014. Delta Mush: Smoothing Deformations While Preserving Detail. In DigiPro. 7-11.
R. Schmidt, C. Grimm, and B. Wyvill. 2006. Interactive Decal Compositing with Discrete Exponential Maps. ACM Trans. Graph. 25, 3 (2006), 605-613.

* cited by examiner

PATCH-BASED SURFACE RELAXATION

CROSS-REFERENCE TO RELATED APPLICATIONS

This application claims benefit of U.S. provisional patent application Ser. No. 62/630,763, filed Feb. 14, 2018, which is herein incorporated by reference in its entirety.

BACKGROUND

Field

This disclosure provides techniques for surface relaxation.

Description of the Related Art

The smoothing of shapes in three-dimensional (3D) virtual geometries is referred to as surface relaxation. Surface relaxation techniques have been employed in various stages of 3D animation production pipelines, including rigging and post-simulation cleanups. Traditional surface relaxation has utilized Laplacian smoothing in which, for each vertex of a 3D geometry, an average of neighboring vertices is computed and the vertex is moved toward the computed average. However, such surface relaxation techniques are not suited to reproducing the patch layout of a baseline 3D geometry after the 3D geometry is deformed. In particular, traditional surface relaxation techniques do not permit restoring the rest configuration of a 3D geometry under large deformations or modeling the span of edge flows.

SUMMARY

One embodiment disclosed herein provides a computer-implemented method for relaxing three-dimensional (3D) virtual geometry. The method generally includes determining, for each of a plurality of vertices of a first 3D geometry and corresponding vertices of a second 3D geometry, a respective relaxation offset. The method further includes updating each vertex of the plurality of vertices of the first 3D geometry based, at least in part, on the respective relaxation offset determined for the vertex, the respective relaxation offset determined for a corresponding vertex of the second 3D geometry, and a respective rotation which transfers the respective relaxation offset determined for the corresponding vertex to a coordinate system of the first 3D geometry.

Another embodiment provides a computer-implemented method for surface relaxation. The method generally includes, for each vertex of a plurality of vertices of a three-dimensional (3D) virtual geometry: flattening an edge stencil of the vertex to generate a decal map; determining a respective span-aware weight for each of a plurality of edges in the decal map; and determining a relaxation offset for the vertex using, at least in part, the determined span-aware weights.

Other embodiments include, without limitation, a computer-readable medium that includes instructions that enable a processing unit to implement one or more embodiments of the above methods, as well as a system configured to implement one or more aspects of the above methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments presented herein provide surface relaxation techniques for smoothing the shapes of three-dimensional (3D) virtual geometries. Although quadrilateral meshes are used herein as an example of 3D geometries whose surfaces may be relaxed, techniques disclosed herein may generally be used to smooth any type of 3D geometry, including triangle meshes. In one embodiment, a surface relaxation application determines, for each vertex of a 3D virtual geometry, span-aware weights for each edge incident to the vertex based on the alignment of other edges incident to the vertex with an orthonormal frame of the edge constructed using a decal map. As used herein, a "span" refers to a curve over the surface of a 3D geometry, and edges of the 3D geometry will typically follow such curves. Further, an orthonormal "frame" of an edge refers to a coordinate system constructed for the edge, with the direction of the edge as one of the axes of the frame and an orthogonal direction as another axis of the frame. The surface relaxation application may use span-aware weights to compute weighted averages that provide surface relaxation offsets. Such relaxation offsets are also referred to herein as "vertex displacements." In one embodiment, the surface relaxation application may restore relaxation offsets from one 3D geometry to another, such as from an original 3D geometry (also referred to herein as a "rest," "rest pose," or "baseline" 3D geometry) to a deformed 3D geometry (also referred to herein as a "posed" 3D geometry), by computing relaxation offsets for vertices in both the original and the deformed 3D geometries, determining rotations that take a baseline frame of each vertex in the original 3D geometry to a corresponding frame in the deformed 3D geometry, and transferring the relaxation offsets from the original 3D geometry to the deformed 3D geometry using the determined rotations and a blending of the relaxation offsets computed for the original and deformed 3D geometries. In another embodiment, the surface relaxation application may preserve the volume of a 3D geometry by computing relaxation offsets in the plane using the two-dimensional (2D) decal maps discussed above, as opposed to in 3D, and then "lifting" the relaxed vertices in 2D back to the 3D geometry based on correspondences between locations in the 2D decal maps and heights in the 3D geometry.

In the following, reference is made to embodiments of the invention. However, it should be noted that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a surface relaxation application) or related data available in the cloud. For example, a surface relaxation application could execute on a computing system in the cloud to perform surface relaxation for 3D geometries, and store the 3D geometries with relaxed vertices at a storage location in the cloud. Doing so allows a user to access this information from any computing system attached to a network connected to the cloud (e.g., the Internet).

Figure 1:
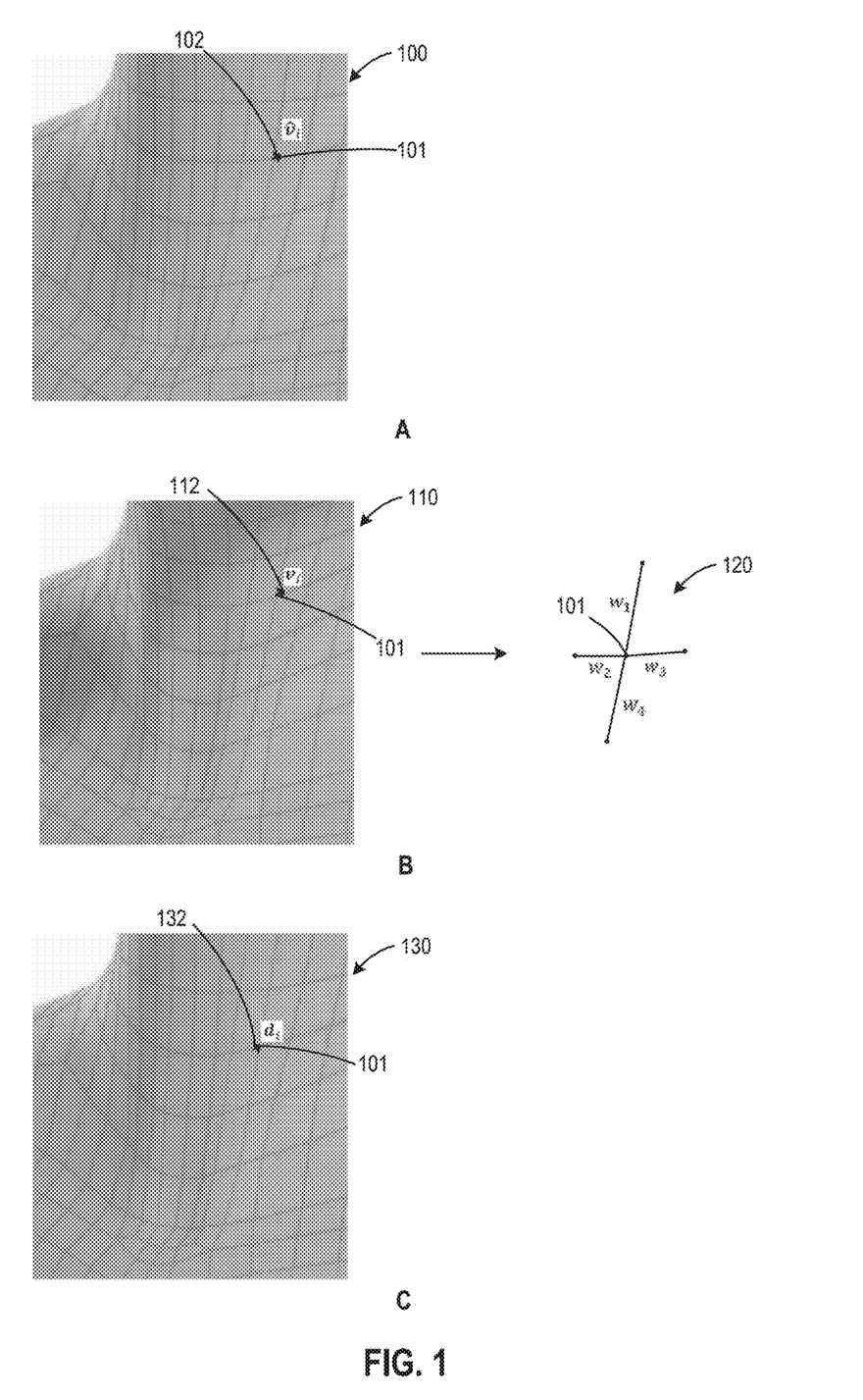
FIG. 1 illustrates an approach for relaxing three-dimensional (3D) virtual geometry, according to an embodiment.

FIG. 1 illustrates an approach for relaxing a 3D virtual geometry 100, according to an embodiment. Panel A shows the 3D geometry 100, which is an example neck articulation before surface relaxation is applied to restore relaxation offsets from an original 3D geometry 110, shown in panel B. In one embodiment, the surface relaxation employs a weighting scheme that uses local decal maps to encode the structure of edge flows formed by a desirable patch layout. An example of such a local decal map 120 for a vertex 101 in the original 3D geometry 110 is shown in panel B. Although one decal map 120 is shown for illustrative purposes, a surface relaxation application (e.g., the surface relaxation application 922 discussed below with respect to FIG. 9) may generally determine a respective local decal map for each vertex (of a number of vertices) in the original 3D geometry 110.

Figure 2:
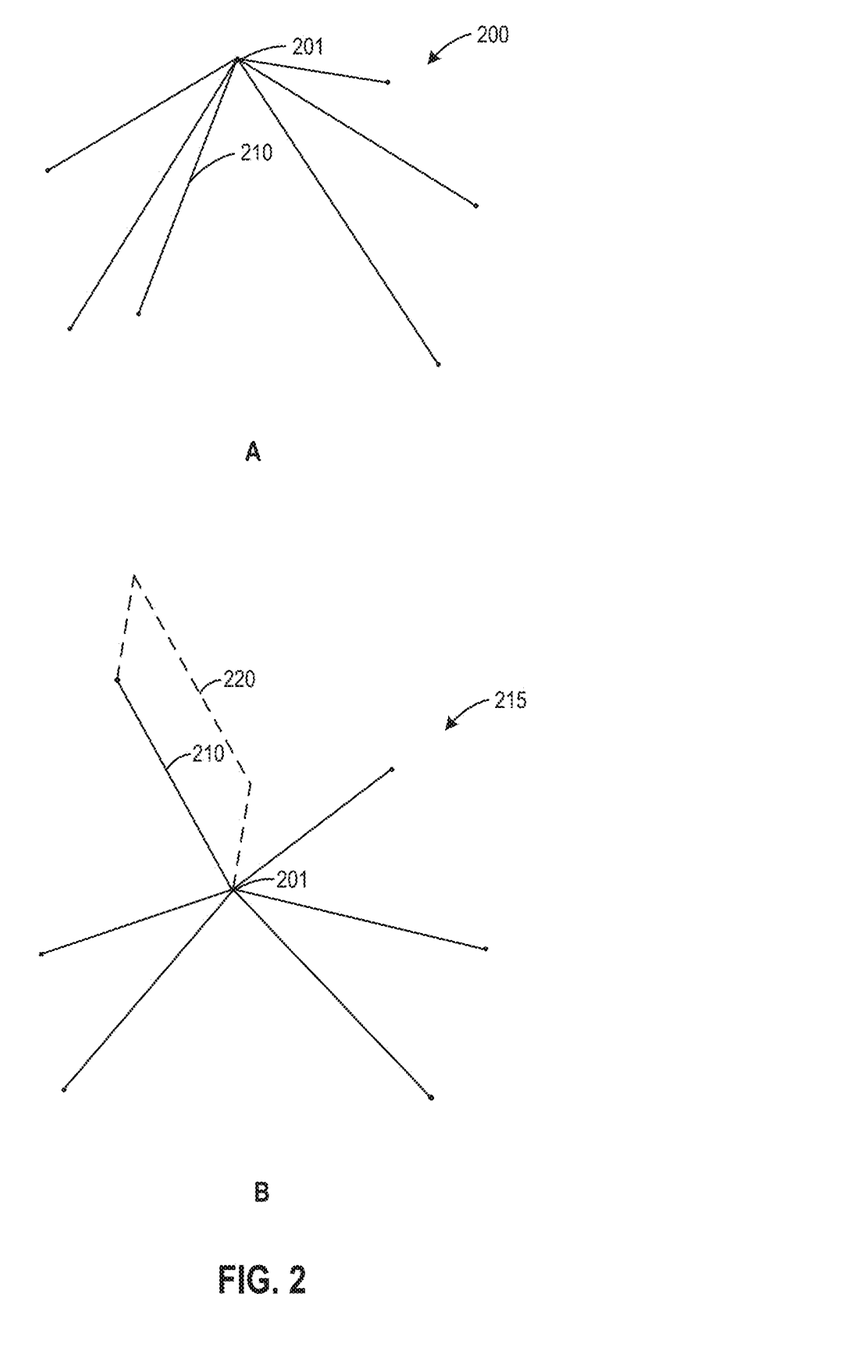
FIG. 2 illustrates the construction and use of an example decal map to determine span-aware weights, according to an embodiment.

FIG. 2 illustrates in greater detail the construction and use of an example decal map 215 to determine span-aware weights, according to an embodiment. As shown in panel A, a portion of a 3D geometry 200 includes a vertex 201 and edges, such as edge 210, that are incident to the vertex 201.

As shown in panel B, the 2D decal map 215 is generated from the 3D geometry 200 by flattening edges incident to the vertex 201 to a plane. A decal map generated for a vertex defines the parameterization of its edge stencil. As used herein, an "edge stencil" refers to the edges incident to a vertex, and a "patch" is a region demarcated by an edge stencil. Every vertex is associated with a patch demarcated by its edge stencil. In one embodiment, the surface relaxation application constructs two decal maps per vertex, one for the posed 3D geometry x and another with respect to the rest points $\hat{x}$. In particular, two decal maps, one at rest and another at pose, are constructed for each vertex in an embodiment in which 2D displacement vectors are calculated and lifted to 3D, discussed in greater detail below, while in another embodiment in which 3D displacement vectors are calculated, only one rest decal map is constructed per vertex in order to compute span-aware weights, as discussed below. In order to construct a decal map for a vertex i, the surface relaxation application may traverse edges incident to the vertex i counter-clockwise and compute a stencil parametrization using geodesic polar coordinates. Doing so produces 2D coordinates u that preserve the (geodesic) lengths of the corresponding 3D edges (i.e., $\|u_i-u_j\|=\|x_i-x_j\|$), and angles between consecutive edges may be uniformly scaled to sum to $2\pi$. For example, the surface relaxation application may select one of the edges incident to a vertex and use the vertex as the origin; draw the selected edge in the plane, preserving its length; and for each subsequent edge, flatten that edge to the plane while preserving its distance to the vertex and making the angle between consecutive edges the same as in 3D, but scaled so that a sum of the angles between all of the edges equals 360 degrees (i.e., $2\pi$). Illustratively, the lengths of edges incident to the vertex 201 in the 3D geometry 200 are preserved in the decal map 215, but angles between those edges are scaled so that the sum of the angles is 360 degrees. For boundary vertices, the surface relaxation application may map the edge stencil to a half disk by normalizing the angle sum to $\pi$.

Once constructed, a decal map may be used to determine span-aware weights for edges incident to a vertex. As described, a "span" refers to a curve over the surface of a 3D geometry, and the span-aware weights according to embodiments described herein are able to account for curves shaping a 3D geometry. In particular, the span-aware weights disclosed herein permit surface relaxation to be aligned with spans, which is unlike traditional Laplacian weights that produce a uniform average of neighboring vertices. It should be noted that the edge flows of 3D geometries, such as meshes that are subdivision surfaces, may contain important artistic decisions carefully crafted by, e.g., modelers and riggers. For example, an artist may place a number of vertices very close to each other and another vertex further away. In such a case, a uniform average, such as a weighted average using Laplacian weights, may lose the desired spacing, whereas the span-aware weights disclosed herein may not. In one embodiment, a weighting heuristic is used that exploits the arrangement of edge flows by accounting for the length and angular coordinates of edge stencils encoded by decal maps. The intuition behind such a weighting heuristic is that the weight $w_{ij}$ of an oriented edge ij can be set by evaluating the decal map at vertex i along and across the edge ij. More concretely, for each edge ij in a decal map u of the vertex i, the surface relaxation application may construct an orthonormal frame aligned to the edge ij and determine the largest and smallest projections of every other stencil edge to the frame using, e.g., the dot product. Illustratively, an orthonormal frame 220 may be constructed for the edge 210 and used to determine the largest and smallest projections of other edges incident to the vertex 201 to the frame 220. Using the largest and smallest projections, the surface relaxation application determines a pair of positive $\bar{c}$ and negative $\underline{c}$ values estimating the flow circulation tangent to ij (with $\bar{c}$ being a value for the edge that, when projected to the original edge, is largest, i.e., best aligned with the original edge, and $\underline{c}$ being an edge that when projected to the original edge produces the smallest (i.e., most negative) value due the edge being aligned but opposite in orientation to the original edge), and another pair $\bar{f}$ and $\underline{f}$ of values indicating the in- and out-fluxes perpendicular to ij (which are similar to $\bar{c}$ and $\underline{c}$ but for projections with respect to a direction orthogonal to the original edge). Intuitively, such values indicate, if a grid were to be fit along an edge and using the stencil, what is the best grid that could be used, and the span-aware weight associated with each edge may be determined based on such a best grid.

In one embodiment, the surface relaxation application sets each edge weight to $w_{ij}=|\underline{c}|(\bar{f}-\underline{f})$ and normalizes the stencil sum to one. It should be noted that $\underline{f}$ is always negative due to how the decal map is constructed. The $w_{ij}=|\underline{c}|(\bar{f}-\underline{f})$ weighting favors neighboring vertices that share an edge with vertex i and form the shorter part of edge flows, indicated by large |c|, and orthogonal to long spans, indicated by f̄–f. That is, the weighting favors neighbors that are close but have a long span in each direction and a long orthogonal span. The intuition behind span-aware weights is that the surface relaxation should slide along the most relevant spans (or directions) that edges incident to a vertex form. For example, when a grid is identified that is large and stretched in both directions, this indicates an associated edge is a good direction for relaxing. In the special case of grid-like patches, the span-aware weights disclosed herein resemble a bi-linear interpolation that blends the relaxation along each span curve. As a result, the span-aware weights may relax surfaces while preserving edge flows.

Returning to FIG. 1, in order to transfer a desirable layout of the rest points $\hat{x}$ to the deformed 3D geometry x, the surface relaxation application may transfer the relative position of vertex i within $\hat{x}$ to x, which is similar to rotated Laplacian coordinates but using decal maps. In one embodiment, the surface relaxation application computes weights $w_{ij}$ for edges incident to vertex i using the rest decal map $\hat{u}$, according to the approach for determining span-aware weights described above. Examples of such weights $w_{1-4}$ are shown in panel B. The surface relaxation application then utilizes the weights to define the relative position vector of vertex i within the rest patch: $\hat{v}_i = \Sigma_{ij} w_{ij}(\hat{x}_j - \hat{x}_i)$. This calculation sums the weights of each edge ij times the vector that connects vertex i to vertex j (indicated by $\hat{x}_j - \hat{x}_i$). An example of such a relative position vector 102 is shown in panel A. Similarly, the surface relaxation application uses the rest-based weights to compute the relative position vector for the deformed patch: $v_i = \Sigma_{ij} w_{ij}(x_j - x_i)$. An example of such a relative position vector 112 is shown in panel B.

In addition, the surface relaxation application computes orthonormal frames (not shown) to both the rest and the deformed patches, and the surface relaxation application employs such frames to determine a rotation matrix $R_i$ that transfers the rest vector $\hat{v}_i$ to the coordinate system of the deformed 3D geometry so that the displacements computed for the rest and deformed patches live in the same coordinate system. That is, two orthonormal frames are computed, one for the deformed patch and one for the rest patch, and such frames are used to determine a rotation that moves the frame for the rest patch to the frame for the deformed patch, in order to transfer the relative position vector within the rest patch to the deformed patch.

Subsequent to determining the relative position vector $\hat{v}_i$ for the rest patch, the relative position vector $v_i$ for the deformed patch, and the rotation matrix $R_i$, the surface relaxation application sets the displacement for each vertex to $d_i = (1-\alpha)v_i + \alpha R_i \hat{v}_i$, where $\alpha$ is a scalar that blends the rest-based correction $\hat{v}_i$ with the relaxation of the posed patch $v_i$. The value of $\alpha$ may be user-defined and controls how similar the relaxation result is to that of the rest patch versus the deformed patch. Panel C shows an example application of a vertex displacement 132 to the vertex 101. In one embodiment, the surface relaxation application applies an explicit half-step update to update the vertex positions in a 3D geometry: $x_i \leftarrow x_i + \frac{1}{2}d_i$. Illustratively, 3D geometry 130 is generated through such a half-step update process.

Figure 3:
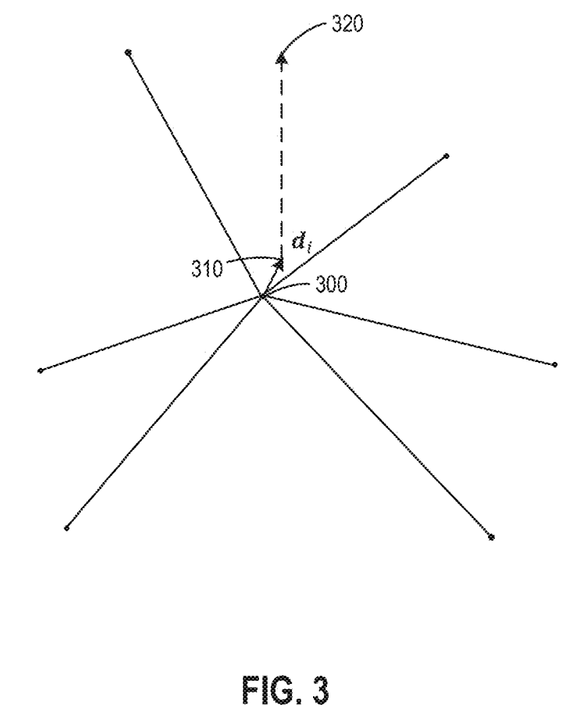
FIG. 3 illustrates an example of restricting vertex displacements to a surface in order to provide volume control, according to an embodiment.

In addition to using span-aware weights to restore the relaxation offsets from an original 3D geometry, in one embodiment the surface relaxation application may also preserve the volume of a 3D geometry by "sliding" points along the surface of the 3D geometry. Doing so may resolve edge clumping while preserving volume. It should be understood that volume may not otherwise be preserved when vertices of a 3D geometry are moved in 3D space. FIG. 3 illustrates an example of using a decal map to restrict vertex displacement to a surface in order to provide volume control, according to an embodiment. As shown, a vertex 300 is displaced with a surface-constrained displacement by using 2D coordinates u and û, described above, to compute surface-constrained displacements in a similar manner as that discussed above with respect to 3D coordinates, except the 2D coordinates u and û are used rather than the 3D coordinates x and $\hat{x}$. Doing so results in a 2D displacement vector $d_i$, such as the vector 310 shown in FIG. 3, that can be added to the vertex position $u_i$, and the result lifted back to 3D by interpolating the geodesic polar coordinates u. The lifting process determines, for a relaxed vertex location in the plane, what its height should be, based on the fact that points in the plane have corresponding heights associated with 3D locations from which edges were flattened to the plane, allowing corresponding heights to be read and assigned to the relaxed vertex in the plane in order to "lift" the relaxed vertex back to the surface of the geometry in 3D. Illustratively, the surface relaxation application has determined a height 320 for the relaxed vertex location. It should be noted that, as height is preserved in the lifting process, volume of the 3D geometry is not lost. That is, vertices are constrained to move on a 3D geometry's surface, without going inside or outside the surface. In another embodiment, a user-specified scaling may be used to blend the 3D displacement with the result of a surface-constrained relaxation.

Figure 4:
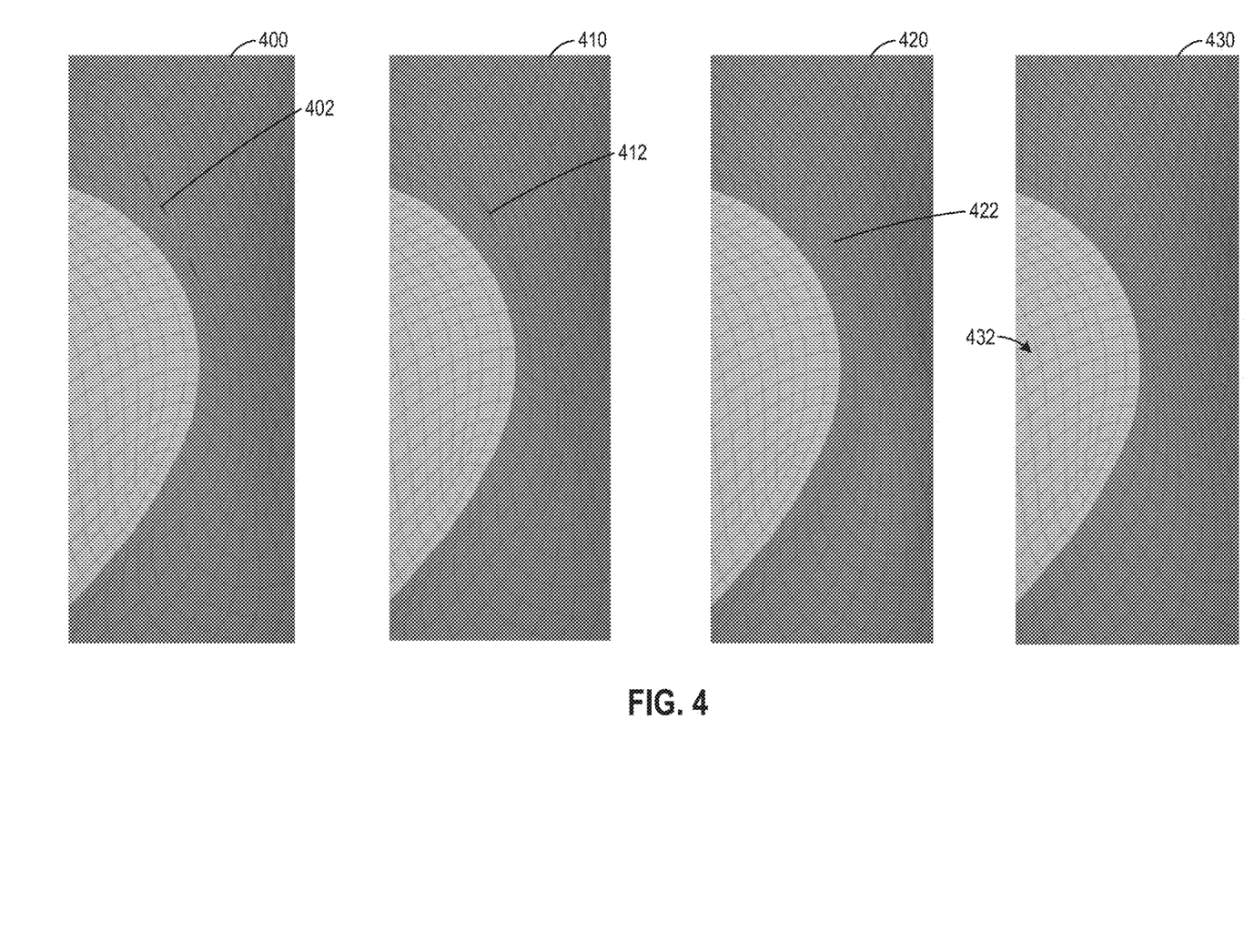
FIG. 4 illustrates examples of traditional surface relaxation and surface relaxation according to an embodiment.

FIG. 4 illustrates examples of traditional surface relaxation and surface relaxation according to an embodiment. As shown, an example virtual 3D geometry 400, which is produced using a cloth simulation, includes clumping of edges and foldovers. For example, edge 402 is clumped together with other edges in the 3D geometry 400.

Surface relaxation techniques, such as traditional Laplacian smoothing or variants thereof, may be used in an attempt to remove clumping in the 3D geometry 400. As described, Laplacian smoothing moves each vertex to an average of its neighboring vertices. However, 3D geometry 410 produced by Laplacian smoothing includes vertices that are not evenly spaced, and some edges in the 3D geometry (e.g., edge 412) remain clumped together with other edges. In particular, the illustrated Laplacian smoothing fails to resolve inverted elements.

Traditional variants of Laplacian smoothing, including those typically used in 3D animation production pipelines, may encounter similar issues as Laplacian smoothing. For example, 3D geometry 420, which is produced by a traditional variant of Laplacian smoothing known as "Delta Mush," also includes unevenly spaced vertices and clumping of edges (e.g., edge 422) with each other. In particular, edge spans are collapsed in the 3D geometry 420.

By contrast, 3D geometry 430, which is produced by surface relaxation according to an embodiment, includes evenly-spaced vertices, with no clumping. Further, edges of the 3D geometry 430 form smooth curves that span around a left-side region 432 of the 3D geometry 430. That is, the patch-based surface relaxation disclosed herein is able to restore edge spacing and smoothing.

Figure 5:
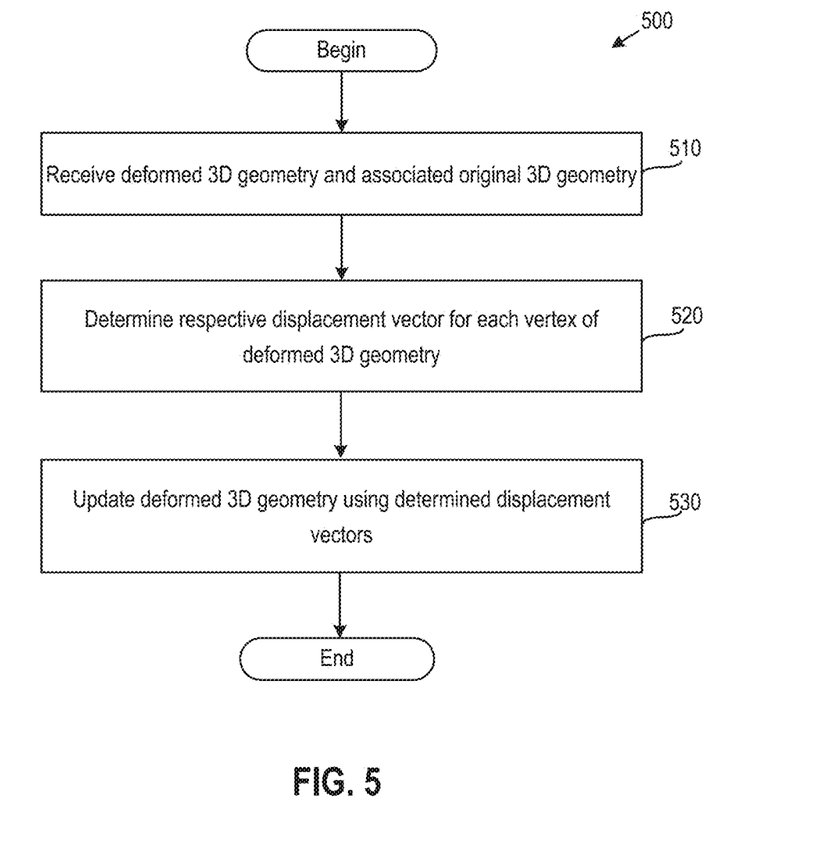
FIG. 5 illustrates a method for surface relaxation, according to an embodiment.

FIG. 5 illustrates a method 500 for surface relaxation, according to an embodiment. As shown, the method 500 begins at step 510, where a surface relaxation application receives a deformed 3D geometry and an associated original 3D geometry. Although discussed herein primarily with respect to one 3D geometry that is the deformation of another 3D geometry (i.e., the other 3D geometry after posing), in general any two 3D geometries having the same number of vertices may be used. For example, an artist may sculpt a shape of an original 3D geometry, and an animator may articulate the sculpted shape, thereby deforming the shape but preserving the number of vertices. Suppose the animator dislikes the result of the deformation because of, e.g., clumping, foldovers, etc. as described above. In such a case, surface relaxation according to techniques disclosed herein may be employed to clean up the deformed 3D geometry by attempting to restore the original 3D geometry.

Figure 6:
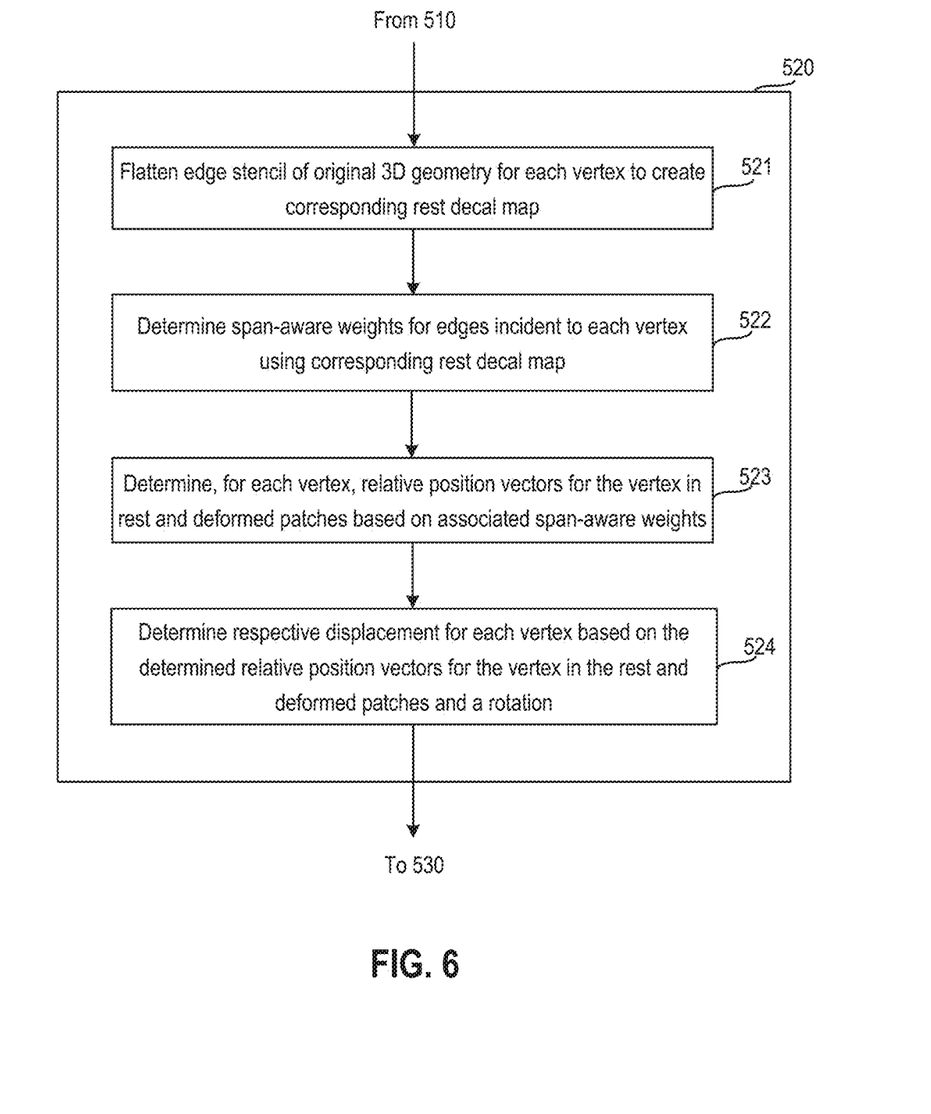
FIG. 6 illustrates one of the steps in the method of FIG. 5 in greater detail, according to an embodiment.

At step 520, the surface relaxation application determines a respective displacement vector for each vertex of the deformed 3D geometry. Although sometimes discussed herein with respect to "each vertex," it should be understood that in general not every vertex needs to be considered during surface relaxation. FIG. 6 illustrates step 520 in greater detail, according to an embodiment. As shown, at step 521, the surface relaxation application flattens an edge stencil of the original 3D geometry for each vertex to create a corresponding decal map. As described, the surface relaxation application may traverse edges incident to each vertex counter-clockwise and compute a stencil parametrization using geodesic polar coordinates, thereby preserving the (geodesic) lengths of 3D edges, with angles between consecutive edges uniformly scaled to sum to 360 degrees (or, in the case of edge stencils, map the edge stencil to a half disk by normalizing the angle sum to 180 degrees).

Figure 7:
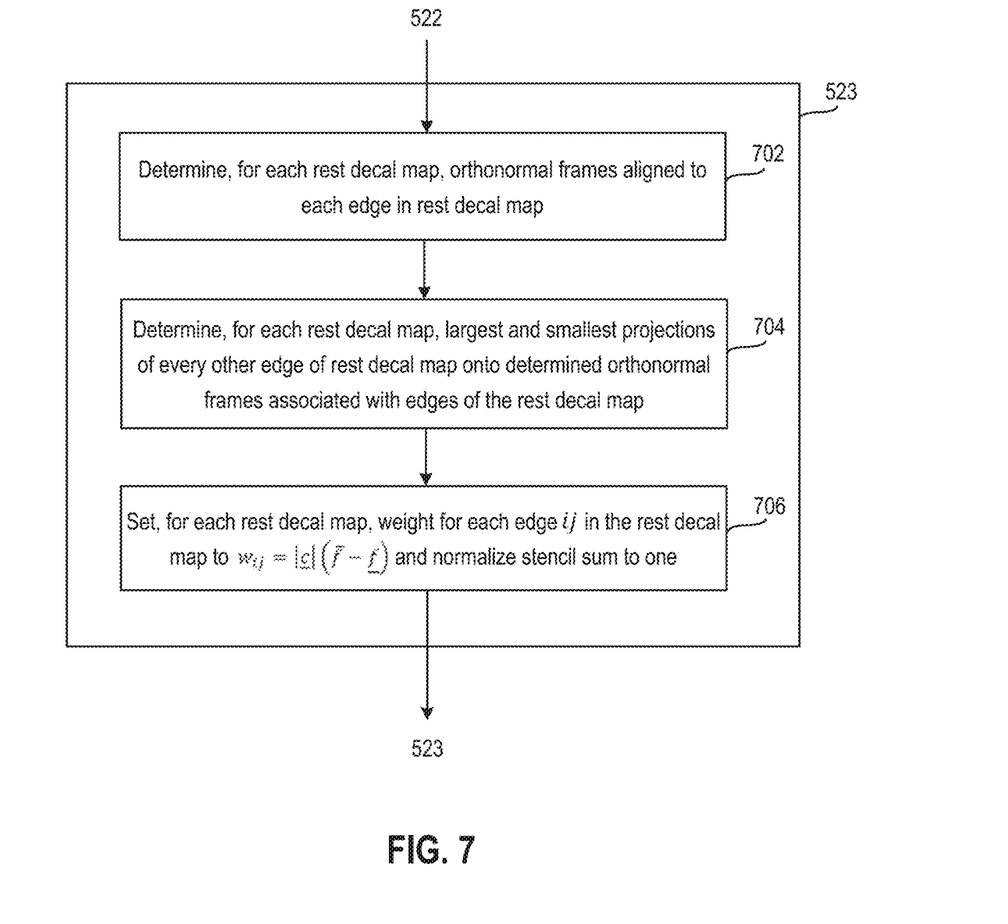
FIG. 7 illustrates one of the steps shown in FIG. 6 in greater detail, according to an embodiment.

At step 522, the surface relaxation application determines span-aware weights for edges incident to each vertex using a corresponding rest decal map. FIG. 7 illustrates step 522 in greater detail, according to an embodiment. As shown, at step 702, the surface relaxation application determines, for each rest decal map, orthonormal frames aligned to each edge of the rest decal map. As described, an orthonormal frame constructed for an edge is a coordinate system with the direction of the edge as of one of its axes and an orthogonal direction as another axis.

At step 704, the surface relaxation application determines, for each rest decal map, the largest and smallest projections of every other edge of the rest decal map onto the determined orthonormal frames associated with edges of the rest decal map. For example, the surface relaxation application may use the dot product to determine the projections of each of the other edges to the two directions of each orthonormal frame, giving how much each of the other edges is colinear or orthogonal to the edge associated with the frame. As described, doing so produces a pair of positive $\bar{c}$ and negative $\underline{c}$ values estimating the flow circulation tangent to each edge ij, and another pair $\bar{f}$ and $\underline{f}$ of values indicating the in- and out-fluxes perpendicular to ij.

At step 706, the surface relaxation application sets, for each rest decal map, a weight for each edge ij in the rest decal map to $w_{ij}=|c|(\bar{f}-\underline{f})$ and normalizes the stencil sum to one. That is, the surface relaxation application sets the weights given to each of the edges during a surface relaxation averaging computation for the vertex based on the projections determined at step 704, such that the weights are based on the alignment of other edges of a vertex with frames of each edge of the vertex. As described, such a weighting scheme is span-aware in that it accounts for curves that are shaping the 3D geometry.

Returning to FIG. 6, at step 523, the surface relaxation application determines, for each vertex, relative position vectors for the vertex in the rest and deformed patches based on associated span-aware weights. In one embodiment, the surface relaxation application utilizes the weights to define the relative position vector of vertex i within the rest patch as $\hat{v}_i = \Sigma_{ij} w_{ij}(\hat{x}_j - \hat{x}_i)$ and further uses the rest-based weights to compute the relative position vector for the deformed patch as $v_i = \Sigma_{ij} w_{ij}(x_j - x_i)$, as described above. That is, the surface relaxation application computes relaxation offsets for each vertex of the original and deformed 3D geometries. It should be noted that such offsets may generally be different.

In another embodiment, the surface relaxation application may compute surface-constrained displacements in the plane using 2D decal maps, as opposed to in 3D, as described above. This takes advantage of the fact that each vertex and edge in a 3D geometry has a corresponding vertex or edge in the plane after the 3D geometry is flattened to the plane. As a result, the surface relaxation application may relax vertices in the plane and then determine, for the relaxed locations in the plane, corresponding heights based on the known mapping of 3D locations to the plane. The surface relaxation application may then assign the determined heights to the relaxed vertices, thereby "lifting" those vertices back to the 3D geometry. As height is preserved in such a process and vertices do not go inside or outside the surface of the 3D geometry, volume of the 3D geometry is not lost. Essentially, such a surface relaxation relaxes the way that vertices are arranged while preserving the shape formed by those vertices and therefore the volume of the 3D geometry. In another embodiment, a user-specified scaling may be used to blend the 3D displacement with the result of a surface-constrained relaxation.

Figure 8:
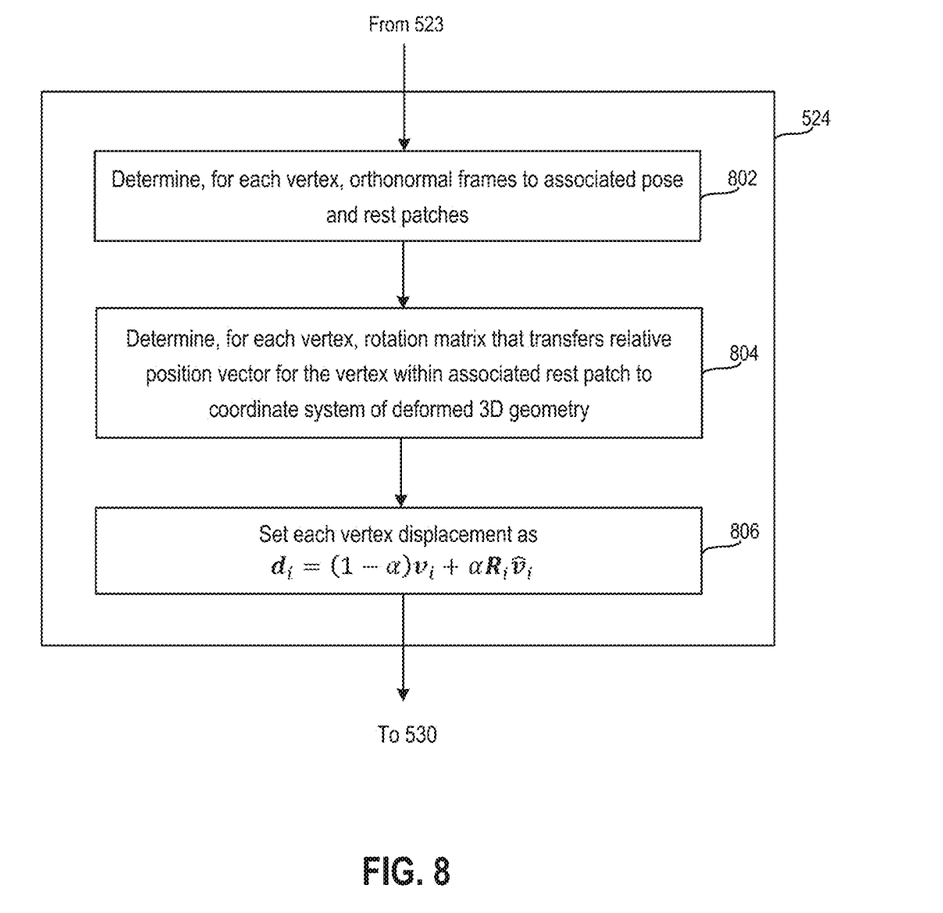
FIG. 8 illustrates another step shown in FIG. 6 in greater detail, according to an embodiment.

At step 524, the surface relaxation application determines a respective displacement for each vertex based on the determined relative position vectors for the vertex in the rest and deformed patches and a rotation. FIG. 8 illustrates step 524 in greater detail, according to an embodiment. As shown, at step 802 the surface relaxation application determines, for each vertex, orthonormal frames to the associated pose and rest patches. As described, every vertex is associated with a patch demarcated by its edge stencil. In one embodiment, every vertex is also assigned to an orthonormal frame needed to compute a rotation from the rest to the pose geometries. In such a case, every patch has an associated orthonormal frame provided by its corresponding vertex.

At step 804, the surface relaxation application determines, for each vertex, a rotation matrix $R_i$ that transfers the relative position vector for the vertex within the associated rest patch to a coordinate system of the deformed 3D geometry. In one embodiment, the surface relaxation application may compute a rotation that take the baseline frame of the vertex in the original geometry to a frame associated with the same vertex in the deformed geometry. In another embodiment, described above, in which a 2D displacement vector is computed and the displaced vertex lifted back to 3D, a rotation matrix does not need to be computed, as the decal maps of the rest and pose patches are already in the same coordinate system.

At step 806, the surface relaxation application sets each vertex displacement as $d_i = (1-\alpha)v_i + \alpha R_i \hat{v}_i$. Here, $d_i$ is the final vertex displacement, $v_i$ is the relative position vector for vertex i the deformed 3D geometry, $\hat{v}_i$ is the relative position vector for vertex i in the original 3D geometry, $R_i$ is a rotation matrix that transfers the rest state vector $\hat{v}_i$ to a coordinate system of the deformed 3D geometry, and $\alpha$ is a user-defined scalar value that may be adjusted to specify how the rest-based correction is blended with the relaxation offset determined for the deformed geometry.

Returning to FIG. 5, at step 530, the surface relaxation application updates the deformed 3D geometry using the vertex displacement vectors determined at step 520. In one embodiment, the surface relaxation application may apply an explicit half-step update to update the locations of the vertices in the deformed 3D geometry: $x_i \leftarrow x_i + \frac{1}{2} d_i$.

Figure 9:
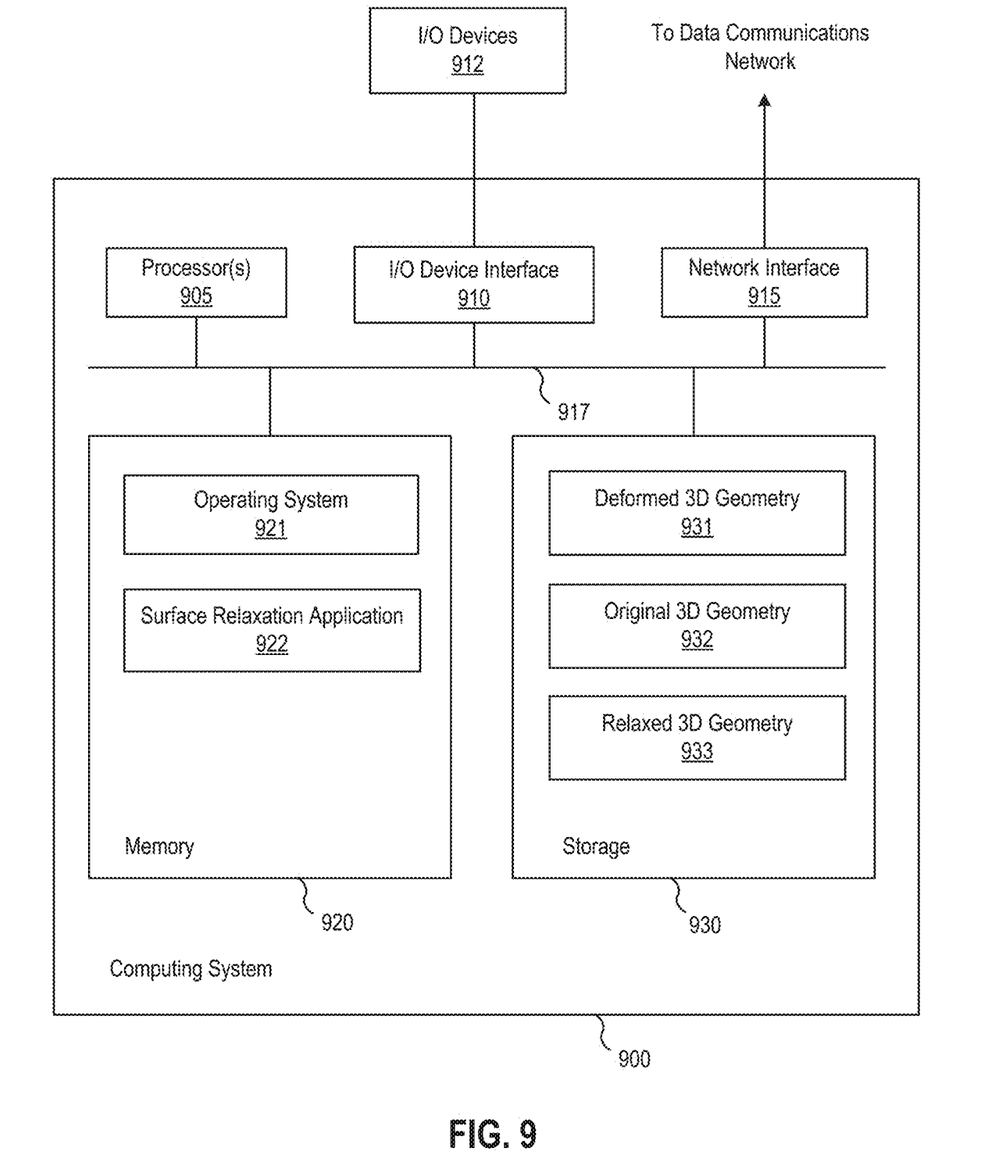
FIG. 9 illustrates a system in which embodiments may be implemented.

FIG. 9 illustrates a system in which embodiments of this disclosure may be implemented. As shown, the system 900 includes, without limitation, a central processing unit (CPU) 905, a network interface 915 connecting the system to a network 916, an interconnect 917, a memory 920, and storage 930. The system 900 may also include an I/O device interface 910 connecting I/O devices 912 (e.g., keyboard, display and mouse devices) to the system 900.

The CPU 905 retrieves and executes programming instructions stored in the memory 920. Similarly, the CPU 905 stores and retrieves application data residing in the memory 920. The interconnect 917 facilitates transmission, such as of programming instructions and application data, between the CPU 905, I/O device interface 910, storage 930, network interface 915, and memory 920. CPU 905 is included to be representative of a single CPU, multiple CPUs, a single CPU having multiple processing cores, one or more graphics processing units (GPUs), a combination of the above, and the like. And the memory 920 is generally included to be representative of a random access memory. The storage 930 may be a disk drive storage device. Although shown as a single unit, the storage 930 may be a combination of fixed and/or removable storage devices, such as magnetic disk drives, flash drives, removable memory cards or optical storage, network attached storage (NAS), or a storage area-network (SAN). Further, system 900 is included to be representative of a physical computing system as well as virtual machine instances hosted on a set of underlying physical computing systems. Further still, although shown as a single computing system, one of ordinary skill in the art will recognized that the components of the system 900 shown in FIG. 9 may be distributed across multiple computing systems connected by a data communications network.

As shown, the memory 920 includes an operating system 921 and a surface relaxation application 922. The operating system 921 may be, e.g., Linux® or Microsoft Windows®. The surface relaxation application 922 is configured to perform surface relaxation according to techniques disclosed herein. In one embodiment, the surface relaxation application 922 may receive a deformed 3D geometry and an associated original 3D geometry, determine a respective displacement vector for each vertex of the deformed 3D geometry, and update the deformed 3D geometry using the determined vertex displacement vectors, according to the method 500 described above with respect to FIGS. 5-8.

Advantageously, the surface relaxation techniques disclosed herein are span-aware and permit the patch-layout of one 3D geometry, such as a rest pose mesh, to be restored in another 3D geometry, such as a deformed mesh, while also preserving volume. As a result, surface relaxation techniques disclosed herein may, e.g., enrich rigging by restoring local features present in the original 3D geometry. Further, the span-aware weights disclosed herein permit surface relaxation to be aligned with spans, which is unlike traditional Laplacian weights that produce a uniform averaging of neighboring vertices.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The attached appendices provide additional examples of the techniques for surface relaxation discussed above.

While the foregoing is directed to embodiments of the present invention, other and further embodiments of the invention may be devised without departing from the basic scope thereof, and the scope thereof is determined by the claims that follow.

What is claimed is:

1. A computer-implemented method for relaxing three-dimensional (3D) virtual geometry, the method comprising:
    determining, for each of a plurality of vertices of a first 3D geometry and corresponding vertices of a second 3D geometry, a respective relaxation offset; and
    updating each vertex of the plurality of vertices of the first 3D geometry based, at least in part, on the respective relaxation offset determined for the vertex, the respective relaxation offset determined for a corresponding vertex of the second 3D geometry, and a respective rotation which transfers the respective relaxation offset determined for the corresponding vertex to a coordinate system of the first 3D geometry.

2. The method of claim 1, wherein the respective relaxation offset for each vertex of the plurality of vertices of the first 3D geometry and a corresponding vertex of the second 3D geometry is determined using, at least in part, a decal map determined for the corresponding vertex of the second 3D geometry.

3. The method of claim 2, wherein the determining the respective relaxation offset for each vertex of the plurality of vertices of the first 3D geometry and the corresponding vertex of the second 3D geometry includes, for each vertex of the plurality of vertices of the first 3D geometry:
    flattening an edge stencil of the second 3D geometry for the corresponding vertex of the second 3D geometry to create a decal map;
    determining a respective span-aware weight for each of a plurality of edges in the decal map; and
    determining the respective relaxation offset for the vertex of the first 3D geometry and the corresponding vertex of the second 3D geometry using, at least in part, the determined span-aware weights.

4. The method of claim 3, wherein the determining the respective span-aware weight for each of the plurality of edges in the decal map includes, for each edge in the decal map:
    determining an orthonormal frame aligned to the edge;
    determining a largest and a smallest projection of every other edge in the decal map onto the orthonormal frame; and
    determining a span-aware weight for the edge based, at least in part, on the determined largest and smallest projections.

5. The method of claim 4, wherein:
the span-aware weight for the edge is set to $w_{ij}=|\underline{c}|(\bar{f}-\underline{f})$, where $\underline{c}$ estimates flow circulation tangent to the edge, and $\bar{f}$ and $\underline{f}$ are in- and out-fluxes perpendicular to the edge; and
the span-aware weights for the plurality of edges in the decal map are normalized to 1.

6. The method of claim 5, wherein the respective relaxation offset for each vertex of the plurality of vertices of the first 3D geometry and the corresponding vertex of the second 3D geometry are determined as the weighted sums $v_i = \Sigma_{ij} w_{ij}(x_j - x_i)$ and $\hat{v}_i = \Sigma_{ij} w_{ij}(\hat{x}_j - \hat{x}_i)$, respectively, where $x_j - x_i$ and $\hat{x}_j - \hat{x}_i$ are vectors that connect vertex i to vertex j in the first 3D geometry and the second 3D geometry, respectively.

7. The method of claim 6, wherein the updating each vertex of the plurality of vertices of the first 3D geometry includes determining another relaxation offset for the vertex as $d_i = (1-\alpha)v_i + \alpha R_i \hat{v}_i$, where $\alpha$ is a user-defined scalar used to blend $v_i$ and $\hat{v}_i$, and $R_i$ is the respective rotation.

8. The method of claim 7, wherein the other relaxation offset is determined in two dimensions (2D) and lifted to 3D.

9. The method of claim 1, wherein the first 3D geometry is a deformation of the second 3D geometry.

10. A non-transitory computer-readable medium comprising instructions executable by a computer, the computer having one or more physical central processing units (CPUs), wherein the instructions, when executed, cause the computer to perform operations for relaxing three-dimensional (3D) virtual geometry, the operations comprising:
determining, for each of a plurality of vertices of a first 3D geometry and corresponding vertices of a second 3D geometry, a respective relaxation offset; and
updating each vertex of the plurality of vertices of the first 3D geometry based, at least in part, on the respective relaxation offset determined for the vertex, the respective relaxation offset determined for a corresponding vertex of the second 3D geometry, and a respective rotation which transfers the respective relaxation offset determined for the corresponding vertex to a coordinate system of the first 3D geometry.

11. The computer-readable medium of claim 10, wherein the respective relaxation offset for each vertex of the plurality of vertices of the first 3D geometry and a corresponding vertex of the second 3D geometry is determined using, at least in part, a decal map determined for the corresponding vertex of the second 3D geometry.

12. The computer-readable medium of claim 11, wherein the determining the respective relaxation offset for each vertex of the plurality of vertices of the first 3D geometry and the corresponding vertex of the second 3D geometry includes, for each vertex of the plurality of vertices of the first 3D geometry:
flattening an edge stencil of the second 3D geometry for the corresponding vertex of the second 3D geometry to create a decal map;
determining a respective span-aware weight for each of a plurality of edges in the decal map; and
determining the respective relaxation offset for the vertex of the first 3D geometry and the corresponding vertex of the second 3D geometry using, at least in part, the determined span-aware weights.

13. The computer-readable medium of claim 12, wherein the determining the respective span-aware weight for each of the plurality of edges in the decal map includes, for each edge in the decal map:
determining an orthonormal frame aligned to the edge;
determining a largest and a smallest projection of every other edge in the decal map onto the orthonormal frame; and
determining a span-aware weight for the edge based, at least in part, on the determined largest and smallest projections.

14. The computer-readable medium of claim 13, wherein:
the span-aware weight for the edge is set to $w_{ij}=|\underline{c}|(\bar{f}-\underline{f})$, where $\underline{c}$ estimates flow circulation tangent to the edge, and $\bar{f}$ and $\underline{f}$ are in- and out-fluxes perpendicular to the edge; and
the span-aware weights for the plurality of edges in the decal map are normalized to 1.

15. The computer-readable medium of claim 14, wherein the respective relaxation offset for each vertex of the plurality of vertices of the first 3D geometry and the corresponding vertex of the second 3D geometry are determined as the weighted sums $v_i = \Sigma_{ij} w_{ij}(x_j - x_i)$ and $\hat{v}_i = \Sigma_{ij} w_{ij}(\hat{x}_j - \hat{x}_i)$, respectively, where $x_j - x_i$ and $\hat{x}_j - \hat{x}_i$ are vectors that connect vertex i to vertex j in the first 3D geometry and the second 3D geometry, respectively.

16. The computer-readable medium of claim 15, wherein the updating each vertex of the plurality of vertices of the first 3D geometry includes determining another relaxation offset for the vertex as $d_i = (1-\alpha)v_i + \alpha R_i \hat{v}_i$, where $\alpha$ is a user-defined scalar used to blend $v_i$ and $\hat{v}_i$, and $R_i$ is the respective rotation.

17. The computer-readable medium of claim 16, wherein the other relaxation offset is determined in two dimensions (2D) and lifted to 3D.

18. The computer-readable medium of claim 10, wherein the first 3D geometry is a deformation of the second 3D geometry.

19. A computer-implemented method for surface relaxation, the method comprising, for each vertex of a plurality of vertices of a three-dimensional (3D) virtual geometry:
flattening an edge stencil of the vertex to generate a decal map;
determining a respective span-aware weight for each of a plurality of edges in the decal map; and
determining a relaxation offset for the vertex using, at least in part, the determined span-aware weights.

20. The method of claim 19, wherein the determining the respective span-aware weight for each of the plurality of edges in the decal map includes, for each edge in the decal map:
determining an orthonormal frame aligned to the edge;
determining a largest and a smallest projection of every other edge in the decal map onto the orthonormal frame; and
determining a span-aware weight for the edge based, at least in part, on the determined largest and smallest projections.

* * * * *